(12) United States Patent
Shao et al.

(10) Patent No.: US 11,846,848 B2
(45) Date of Patent: *Dec. 19, 2023

(54) BACKLIGHT ASSEMBLY AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Xibin Shao, Beijing (CN); Dongchuan Chen, Beijing (CN); Yanping Liao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,655

(22) Filed: Apr. 10, 2022

(65) Prior Publication Data

US 2022/0236611 A1    Jul. 28, 2022

Related U.S. Application Data

(63) Continuation of application No. 16/664,029, filed on Oct. 25, 2019, now Pat. No. 11,327,363, which is a (Continued)

(30) Foreign Application Priority Data

Feb. 26, 2016 (CN) .......................... 201610108769.4

(51) Int. Cl.
G02F 1/13357 (2006.01)
G02F 1/1335 (2006.01)
F21V 8/00 (2006.01)

(52) U.S. Cl.
CPC ..... G02F 1/133606 (2013.01); G02B 6/0051 (2013.01); G02B 6/0055 (2013.01);
(Continued)

(58) Field of Classification Search
CPC ................... G02F 1/133514; G02F 1/133528
See application file for complete search history.

(56) References Cited

U.S. PATENT DOCUMENTS 11,327,363 B2 * 5/2022 Shao ................... G02B 6/0088
2008/0284929 A1 * 11/2008 Kimura ............... G02F 1/13624
349/48

(Continued)

*Primary Examiner* — Karabi Guharay
(74) *Attorney, Agent, or Firm* — SYNCODA LLC; Feng Ma

(57) ABSTRACT

A display apparatus includes: a display panel; a backlight assembly including a light source; and an optical film group including: a functional material layer; wherein: the light source is configured to emit a white light; and the functional material layer is configured to absorb light in at least one of a range of 480 nm-520 nm or a range of 575 nm-600 nm to thereby reshape the white light to have blue, red, and green peaks; and the display apparatus further includes a polarizer (POL) including one or more polarizer sub-layers, wherein the functional material layer and one of the one or more polarizer sub-layers are configured as one same layer.

20 Claims, 8 Drawing Sheets

Related U.S. Application Data continuation of application No. 15/521,296, filed as application No. PCT/CN2016/094869 on Aug. 12, 2016, now Pat. No. 10,473,976.

(52) U.S. Cl.
CPC ..... *G02B 6/0088* (2013.01); *G02F 1/133514* (2013.01); *G02F 1/133603* (2013.01); *G02F 1/133607* (2021.01); *G02F 1/133614* (2021.01)

(56) References Cited

U.S. PATENT DOCUMENTS

| | | | | |
|---|---|---|---|---|
| 2016/0187708 A1* | 6/2016 | Zhang | ............... | G02F 1/133528 438/30 |
| 2017/0205666 A1* | 7/2017 | Suh | ................... | G02F 1/133504 |

* cited by examiner

BACKLIGHT ASSEMBLY AND DISPLAY APPARATUS

CROSS-REFERENCE TO RELATED APPLICATIONS

The present application is a continuation of, and claims priority to, U.S. patent application Ser. No. 16/664,029 filed on Oct. 25, 2019, which is a continuation of, and claims priority to, U.S. patent application Ser. No. 15/521,296 filed on Apr. 23, 2017 (now U.S. Pat. No. 10,473,976 issued on Nov. 12, 2019), which is a National Stage Entry of PCT/CN2016/094869 filed on Aug. 12, 2016, which in turn claims priority to Chinese Patent Application No. 201610108769.4 filed on Feb. 26, 2016. The disclosures of the above-referenced applications are hereby incorporated by reference in their entirety.

BACKGROUND

As a type of flat-panel display apparatus, LCDs (liquid crystal displays) have increasingly been applied in the field of high-performance display due to their advantages such as small size, low power consumption, low radiation, and low manufacturing cost. However, LCD is a passive light-emitting display device, a backlight unit, or backlight assembly, is typically needed to provide a light source to the device to display images.

SUMMARY

The present disclosure relates generally to the field of display technologies, and more specifically to a backlight assembly and a display apparatus.

In one aspect, the present disclosure provides a backlight assembly. The backlight assembly includes a light source and at least one light-absorbing substance. The light source is configured to emit a white light, the white light comprising at least two primary color lights. The at least one light-absorbing substance is disposed at a light-out side of the light source and configured to absorb light in at least one overlapping portion between spectra of two of the at least two primary color lights in the white light.

In some embodiments of the backlight assembly, the light source includes a light-emitting chip and a phosphor layer. The phosphor layer is configured such that the light-emitting chip emits a first primary color light, the first primary color light becoming the white light after passing through the phosphor layer.

The first primary color light can be a blue light, and the phosphor layer can comprise at least one phosphor, which is configured to form the white light upon activation by the blue light emitted by the light-emitting chip. The phosphor layer can comprise a yellow phosphor, or can comprise a red phosphor and a green phosphor.

In some embodiments of the backlight assembly, the at least one light-absorbing substance can comprise at least one dye.

In some of the above embodiments, the at least one dye can include a cis-isomerized indigo, which can have absorption peaks of about 480 nm and 540 nm.

In others of the above embodiments, the at least one dye can include a trans-isomerized indigo, which can have an absorption peak of about 580 nm.

The at least one light-absorbing substance can exist in a variety of different components in the backlight assembly.

In a first embodiment, the at least one light-absorbing substance can exist in at least one of a light guide plate and at least one optical film in an optical film group of the backlight assembly.

In a second embodiment, the at least one light-absorbing substance can exist in at least one light-absorbing film, which can be disposed on a light-in side, or on a light-out side, of a light guide plate of the backlight assembly. For example, the at least one light-absorbing film can be disposed between the light guide plate and an optical film group of the backlight assembly.

In a third embodiment, the at least one light-absorbing substance can exist in at least one of a diffusive plate and at least one optical film in an optical film group of the backlight assembly.

In a fourth embodiment, the at least one light-absorbing substance can exist in at least one light-absorbing film, which can be disposed on a light-in side, or on a light-out side, of a diffusive plate of the backlight assembly. For example, the at least one light-absorbing film can be disposed on a light-out side of the diffusive plate of the backlight assembly, and the at least one light-absorbing film can include two light-absorbing films, each comprising one different light-absorbing substance.

The backlight assembly can further comprise an optical film group. The optical film group can include an upper prism plate and a lower prism plate, and the two light-absorbing films are disposed respectively between the upper prism plate and the lower prism plate, and between the diffusive plate and the lower prism plate.

In another aspect, a display apparatus is provided. The display apparatus can include a backlight assembly according to any of the embodiments as mentioned above.

In some embodiments, the display apparatus includes: a backlight assembly including a light source; and at least one functional material; wherein: the light source is configured to emit a white light; and the at least one functional material is configured to absorb light in at least one of a range of 480 nm-520 nm or a range of 575 nm-600 nm to thereby reshape the white light to have blue, red, and green peaks.

In some embodiments, the at least one functional material is configured to absorb light in the range of 480 nm-520 nm, to thereby reshape the blue, red, and green peaks to be narrower.

In some embodiments, the at least one functional material is configured to further emit light in at least a range of 530 nm-570 nm or a range of 630 nm-650 nm to thereby improve brightness and expand color gamut of the backlight assembly.

In some embodiments, the at least one functional material is configured to emit light in the range of 530 nm-570 nm, and comprises at least one of Poly[2-methoxy-5-(2-ethylhexyloxy)phenylenevinylene-1,4-diyl](($C_{17}H_{24}O_2$)n), or Poly[2-methoxy-5-(3,7-dimethyloctyloxy)phenylenevinylene-1,4-diyl](($C_{19}H_{28}O_2$)n).

In some embodiments, the at least one functional material is configured to further emit light at 630 nm-650 nm to thereby improve brightness and expand color gamut of the backlight assembly.

In some embodiments, the at least one functional material comprises a quantum dot material corresponding to light emission at 650 nm.

In some embodiments, the at least functional material is configured to further emit light at 630 nm-650 nm to thereby improve brightness and expand color gamut of the backlight assembly.

In some embodiments, the at least one functional material comprises a quantum dot material corresponding to light emission at 650 nm.

In some embodiments, display apparatus further includes a display panel and a polarizer, wherein the at least one functional material is disposed at before and/or after light polarization by the polarizer.

In some embodiments, the polarizer includes: a bottom polarizer proximal to the backlight assembly and including a bottom polarizing membrane (PVA) layer sandwiched between an upper bottom triacetate (TAC) film and a lower bottom TAC film; and a top polarizer distal to the backlight assembly and including a top PVA layer sandwiched between an upper top TAC film and a lower top TAC film.

In some embodiments, the at least one functional material is disposed at the lower bottom TAC film.

In some embodiments, the at least one function material is disposed at the upper top TAC film.

In some embodiments, the polarizer comprises a is polyimide (PI) layer integrated with the display panel, and the at least one functional material is disposed at a glass cover over the display panel.

In some embodiments, the at least one functional material comprises at least one dye.

In some embodiments, the at least one dye comprises a cis-isomerized indigo or a trans-isomerized indigo.

In some embodiments, the at least one dye comprises the trans-isomerized indigo having an absorption peak of about 580 nm.

Other embodiments may become apparent in light of the above embodiments as described above.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

The light source in the backlight assembly typically comes from the white light generated when the blue light-emitting chip activates the yellow phosphor. The spectrum of the light source in a conventional backlight assembly is shown as the waveform I in FIG. 1. The half-wave width of the blue light in the spectrum of the light source is relatively small, and the half-wave widths of the red light and the green light are relatively large.

The liquid crystal display device typically also comprises a color filter layer, configured to optically filter the backlight provided by the backlight assembly. The light transmission spectrum of the color filter layer is as shown as the waveform II in FIG. 1.

Figure 1:
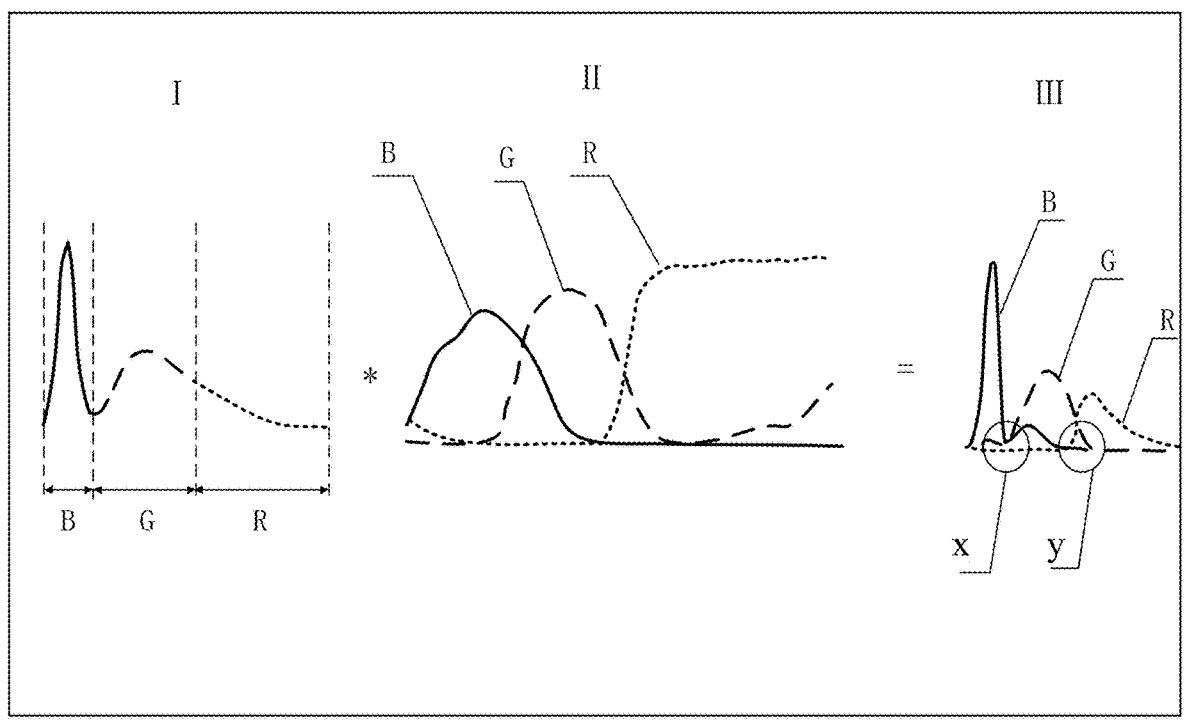
FIG. 1 is a superimposed view of the lights and the color filter layer of a conventional backlight assembly.

As shown in the waveform III in FIG. 1, when the backlight having waveform I passes through the color filter layer that has a transmission spectrum of waveform II, the blue light (B) and the green light (G) have a relatively large overlapping portion of the spectrum at position x, and the green light (G) and the red light (R) have a relatively large overlapping portion of the spectrum at position y.

Figure 2:
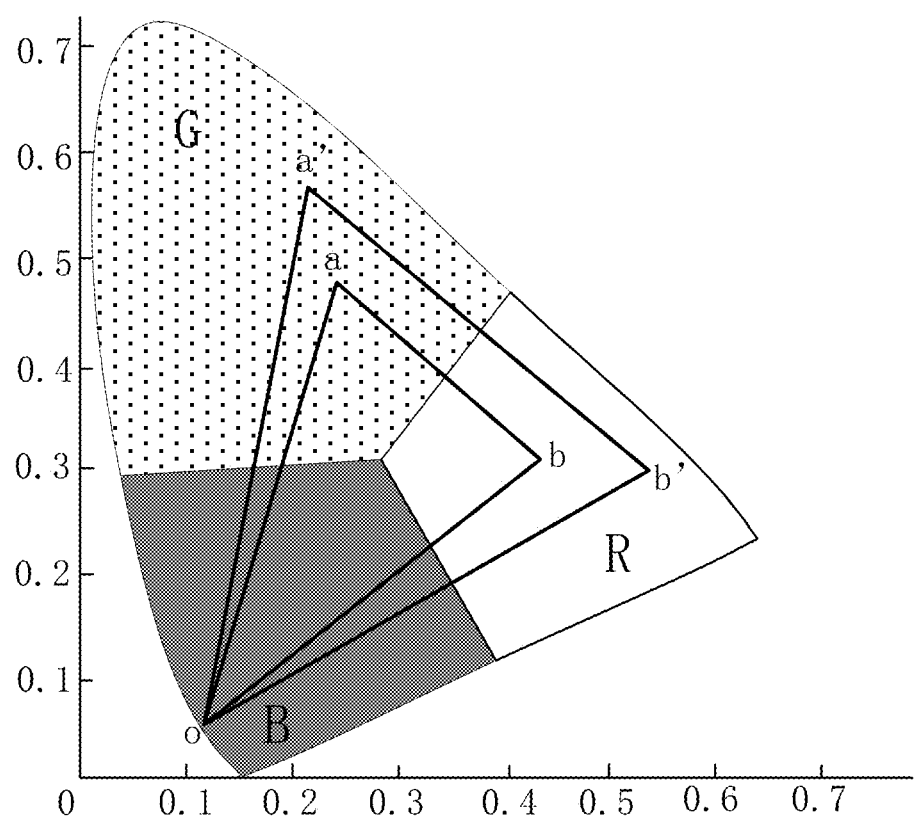
FIG. 2 is a schematic view of color gamut of a conventional backlight assembly.

As a result, the color purity of the emitted green light (G) and red light (R) is relatively low, i.e., the purity of the three primary colors emitted by the backlight assembly is relatively low. In addition, the color coordinate (a) of the green light (G) is pulled closer to that of the blue light (B) and the red light (R), and the color coordinate (b) of the red light (R) is similarly pulled closer to that of the green light (G), as shown in FIG. 2. Consequently, the area of the triangle oab formed by the color coordinates of the red, green and blue light after color filtering is relatively small, and the color gamut of the display apparatus employing the backlight assembly as such is relatively small.

To solve the above issues associated with conventional backlight assemblies, the present disclosure provides a backlight assembly.

The backlight assembly includes a light source and at least one light-absorbing substance. The light source emits a white light, and the at least one light-absorbing substance is disposed at a light-out side of the light source and configured to absorb light in at least one overlapping portion between spectra of two primary color lights in the white light.

The light source of the backlight assembly can include a light-emitting chip and a phosphor layer, and the light-emitting chip can emit a first primary color light, which becomes a white light after passing through the phosphor layer. The white light includes a first primary color light, a second primary color light, and a third primary color light.

The at least one light-absorbing substance can exist in at least one part of the backlight assembly at the light-out side of the light source and is configured to absorb light of certain wavelengths in at least one overlapping portion between spectra of two primary color lights in the white light emitted by the light source.

The first primary color light, the second primary color light, and the third primary color light can be red light, green light, or blue light. Embodiments of the present disclosure will be illustrated in detail with an example where the first primary color light is blue light, the second primary color light and the third primary color light are red light and green light respectively.

In some embodiments of the present disclosure, the light-emitting chip emits a blue light, the second primary color light is a red light, and the third primary color light is a green light. As such, in embodiments of the present disclosure, the light-emitting chip can be a chip that emits a blue light, the phosphor layer can comprise at least one phosphor that can be mixed with the blue light emitted by the light-emitting chip to form a white light.

Specifically, the phosphor layer can include one single color phosphor, or can include a mixture of multiple phosphors. For example, the phosphor layer can comprise only yellow phosphor, and the blue light emitted by the light-emitting chip becomes a white light after passing through the yellow phosphor layer. The phosphor layer can also comprise a mixture of multiple phosphors. For example, it can comprise red phosphor and green phosphor, or it can comprise yellow phosphor and red phosphor, etc. The present disclosure will not list all examples herein.

The at least one light-absorbing substance can absorb light of certain wavelengths in the white light emitted by the light source, i.e., after the light source emits the white light, the white light is output after passing through a part of the backlight assembly containing the at least one light-absorbing substance.

Specifically, the at least one light-absorbing substance can absorb only the light in a first overlapping portion between spectra of the first primary color light and the second primary color light, or can absorb only the light in a second overlapping portion between spectra of the second primary color light and the third primary color light, or can absorb both the light of the first overlapping portion between spectra of the first primary color light and the second primary color light and the light in the second overlapping portion between spectra of the second primary color light and the third primary color light at the same time.

Furthermore, when only the light in the first overlapping portion between spectra of the first primary color light and the second primary color light or the light in the second overlapping portion between spectra of the second primary color light and the third primary color light is absorbed, there can exist only one light-absorbing substance. When both the light in the first overlapping portion between spectra of the first primary color light and the second primary color light and the light in the second overlapping portion between spectra of the second primary color light and the third primary color light are absorbed at the same time, multiple light-absorbing substances can be present at the same time.

Embodiments of the present disclosure are illustrated with an example where the light-emitting chip emits a blue light, the second primary color light is a red light, the third primary color light is a green light, and the at least one light-absorbing substance can absorb both the light in the first overlapping portion between spectra of the first primary color light and the second primary color light and the light in the second overlapping portion between spectra of the second primary color light and the third primary color light at the same time.

Figure 3:
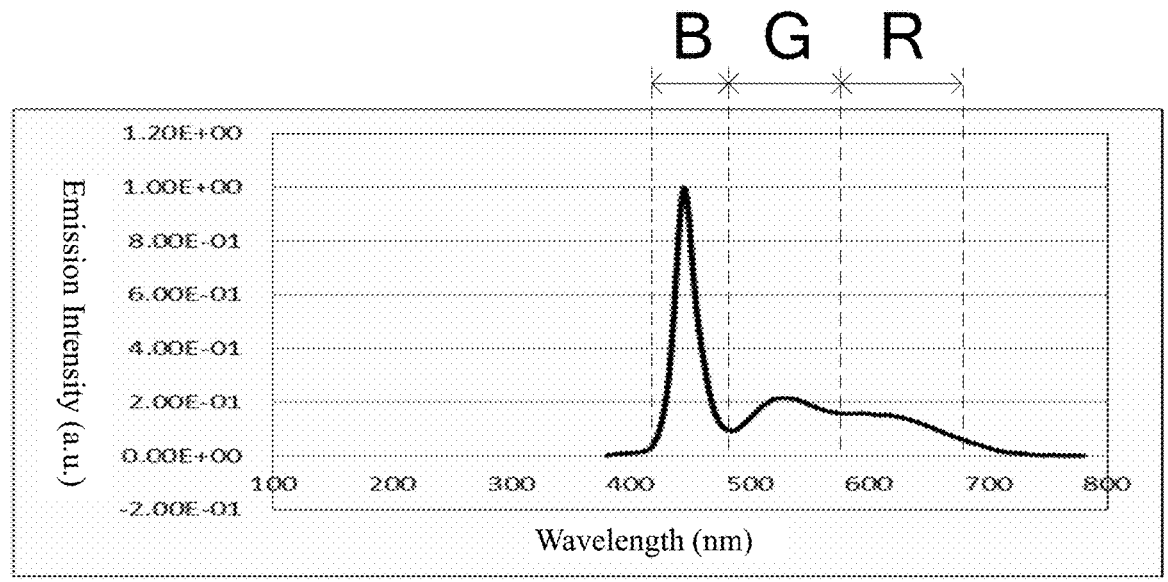
FIG. 3 is a spectrum diagram of the white light emitted by a conventional light source.
Figure 4:
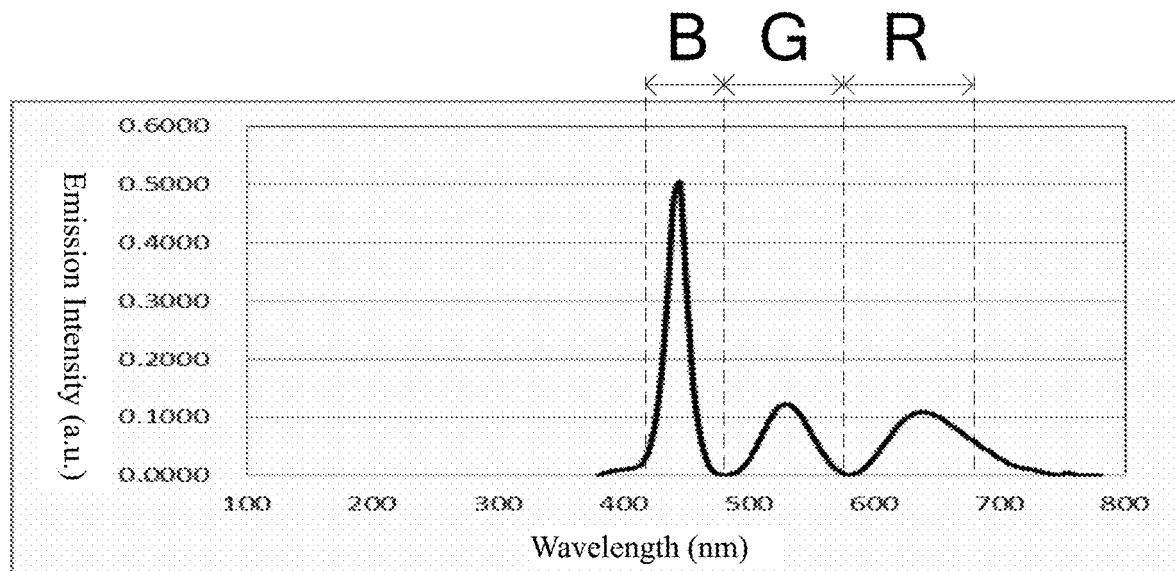
FIG. 4 is a spectrum diagram of the white light emitted by the light source after passing through a light-absorbing substance-containing part of a backlight assembly according to some embodiments of the present disclosure.

Because the light-emitting chip emits blue light, as shown in FIG. 3, the half-wave width of the blue light (B) in the white light emitted by the light source is relatively small, and the half-wave width of the red light (R) and green light (G) are relatively large. The light of certain wavelengths in an overlapping portion between spectra of the red light and the green light in the white light emitted by the light source is absorbed by the at least one light-absorbing substance. The light of certain wavelengths in an overlapping portion between spectra of the blue light and the green light in the white light emitted by the light source is also absorbed by the at least one light-absorbing substance. Compared with that prior to absorption, the overlapping portion of the half-wave widths of the red light (R) and the green light (G) is reduced, and the overlapping portion of the half-wave widths of the blue light (B) and the green light (G) is also reduced. As illustrated in FIG. 4, the half-wave widths of the blue light (B), the red light (R) and the green light (G) are all relatively small.

When the white light of the backlight assembly as disclosed herein passes through the color filter layer that has a transmission spectrum of waveform II in FIG. 1, the overlapping portion of the spectra of the blue light (B) and the green light (G) (shown at position x for a conventional display assembly in FIG. 1), and the overlapping portion of the spectra of the green light (G) and the red light (R) (shown at position y for a conventional display assembly in FIG. 1) also become smaller.

On the one hand, the color purity of the green light (G) and the red light (R) is improved, i.e., the purity of the three primary colors emitted by the backlight assembly is relatively high.

On the other hand, as shown in FIG. 2, the color coordinate (a') of the green light (G), the color coordinate (b') of the red light (R) and the color coordinate (o) of the blue light (B) are all far away from the center, and the area of the triangle oa'b' formed by the color coordinates of the red light, the green light, and the blue light after color filtering is relatively large; as such, the color gamut of the display apparatus employing the backlight assembly is relatively large.

The backlight assembly can further comprise other parts. For example, a backlight assembly typically comprises parts such as a frame, a back plate and reflective film. These parts are not related to the inventive aspects of the present disclosure, and thus description of these parts is skipped herein.

The present disclosure provides a backlight assembly, whose light source comprises a light-emitting chip and a phosphor layer. The light-emitting chip emits a first primary color light, which becomes white light after passing through the phosphor layer. The white light comprises a first primary color light, a second primary color light, and a third primary color light. Because the light-emitting chip emits the first primary color light, the half-wave width of the first primary color light in the backlight emitted by the backlight assembly is relatively small, the half-wave widths of the second primary color light and third primary color light are relatively large.

The backlight assembly further comprises at least one light-absorbing substance, configured to absorb the light in the overlapping portion between spectra of the second primary color light and the third primary color light. As such, the overlapping portion between the spectra of the second primary color light and the third primary color light is reduced. As a consequence, the half-wave widths of the first primary color light, the second primary color light, and the third primary color light in the white light emitted by the backlight assembly become all relatively small, the color purity of the three primary colors emitted by the backlight assembly is increased, and the color gamut of the display apparatus employing the backlight assembly is thus improved.

In some embodiments, the at least one light-absorbing substance is further configured to absorb the light in the overlapping portion between spectra of the first primary color light and the second primary color light in the white light emitted by the light source to further improve the purity of the first primary color light in the backlight assembly and increase the range of color gamut.

It should be appreciated that the at least one light-absorbing substance can be arranged at various positions in the backlight assembly and arranged in various ways. Herein the various ways mean employing existing parts of, or adding new parts to, the backlight assembly.

In some preferred embodiments, at least one optical film can be doped with at least one light-absorbing substance in an optical film group in the backlight assembly, and/or a light guide plate can be doped with at least one light-absorbing substance in the backlight assembly.

Figure 5:
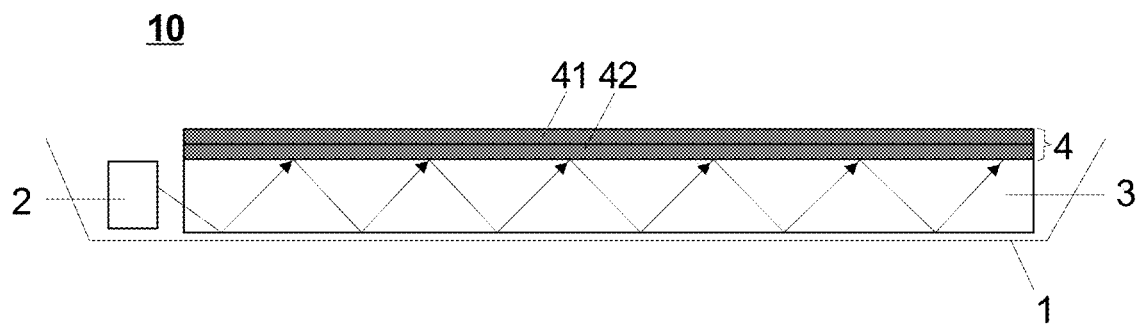
FIG. 5 is a schematic view of a backlight assembly according to a first embodiment of the present disclosure.

FIG. 5 illustrates an example with a side-in backlight assembly. The backlight assembly 10 comprises a light source 2, a reflective plate 1, a light guide plate 3, and an optical film group 4. The light source 2 is disposed at the side of the light guide plate 3; and the light guide plate 3 is doped with at least one light-absorbing substance. When the white light emitted by the light source 2 passes through the light guide plate 3, the at least one light-absorbing substance in the light guide plate 3 can absorb light in at least one overlapping portion of the spectra of two primary color lights in the white light.

Figure 6:
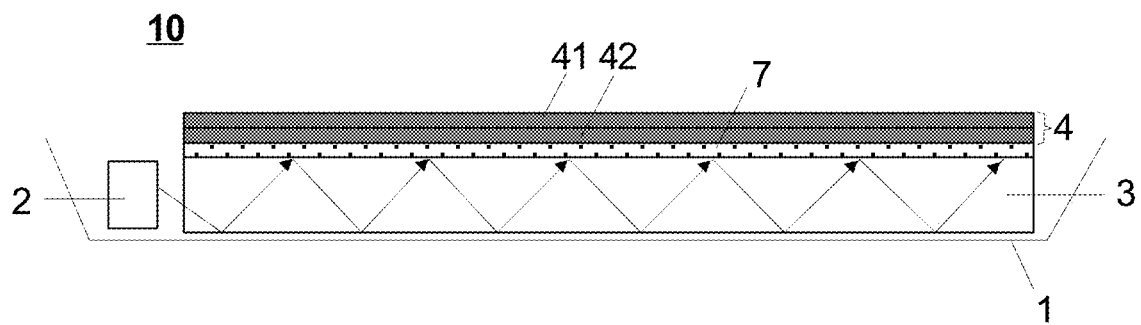
FIG. 6 is a schematic view of a backlight assembly according to a second embodiment of the present disclosure.

Alternatively, as shown in FIG. 6, the backlight assembly 10 comprises a light source 2, a reflective plate 1, a light guide plate 3, and an optical film group 4. The light source 2 is disposed at the side of the light guide plate 3, i.e., it is a side-in backlight assembly. A light-absorbing film 7, doped with at least one light-absorbing substance, is disposed at the light-in side or light-out side of the light guide plate 3 of the backlight assembly 10. FIG. 6 illustrates an example where the light-absorbing film 7 is configured at the light-out side of the light guide plate 3.

Alternatively, in a preferred embodiment, the at least one light-absorbing substance can be doped in at least one optical film in the optical film group of the backlight assembly, and/or in the diffusive plate of the backlight assembly.

Figure 7:
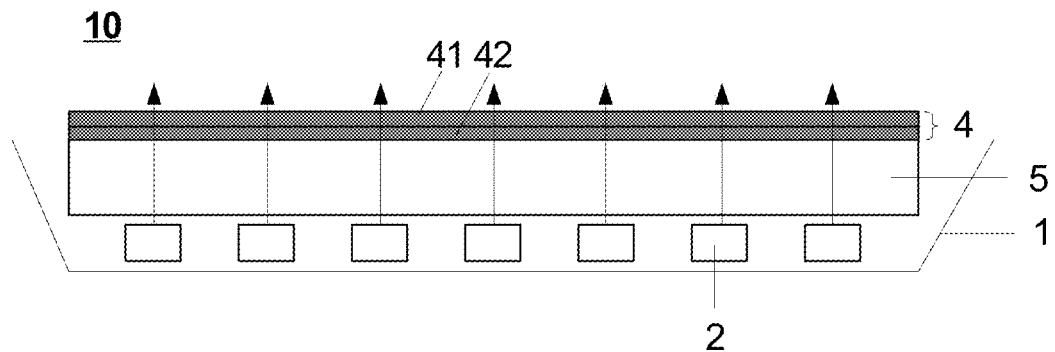
FIG. 7 is a schematic view of a backlight assembly according to a third embodiment of the present disclosure.

As shown in FIG. 7, the backlight assembly 10 is a straight-down backlight assembly, which comprises a light source 2, a reflective plate 1, a diffusive plate 5, and an optical film group 4. The light source 2 is disposed under the diffusive plate 5; and the diffusive plate 5 is doped with at least one light-absorbing substance. When the white light emitted by the light source 2 passes through the diffusive plate 5, the at least one light-absorbing substance in the diffusive plate 5 can absorb light in at least one overlapping portion of the spectra of two primary color lights in the white light.

Figure 8:
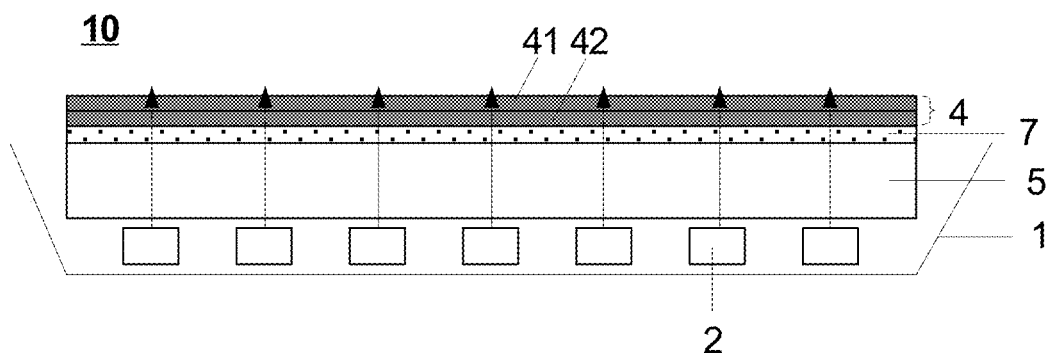
FIG. 8 is a schematic view of a backlight assembly according to a fourth embodiment of the present disclosure.

Alternatively, in a preferred embodiment as shown in FIG. 8, the backlight assembly 10 comprises a light source 2, a reflective plate 1, a diffusive plate 5, and an optical film group 4. The light source 2 is disposed under the diffusive plate 5, i.e., it is a straight-down backlight assembly. The light-absorbing film 7 is doped with at least one light-absorbing substance; the light absorbing film 7 is configured at the light-in or light-out side of the diffusive plate of the backlight assembly. FIG. 8 illustrates an example where the light-absorbing film 7 is configured at the light-out side of the diffusive plate 7.

In some embodiments, as shown in FIGS. 5-8, the backlight assembly 10 further comprises an optical film group 4, which typically also comprises an upper prism plate, and a lower prism plate etc. The present disclosure is illustrated with an example where the optical film group 4 comprises an upper prism plate 41 and a lower prism plate 42. The at least one light-absorbing substance can be present in at least one of the optical film in the optical film group 4 of the backlight assembly 10. As such, when the light emitted by the light source 2 passes through the optical film group 4, the at least one light-absorbing substance in the optical film can absorb light in at least one overlapping portion of the spectra of two primary color lights in the white light.

Alternatively, the at least one light-absorbing substance can exist in a light-absorbing film or a light-absorbing film set, disposed over the surface of at least one optical film in the optical film group of the backlight assembly. That is, the optical film group further comprises a light-absorbing film. When the light emitted by the light source passes through the optical film group, the at least one light-absorbing substance in the light-absorbing film can absorb light in at least one overlapping portion of the spectra of two primary color lights in the white light.

Figure 9:
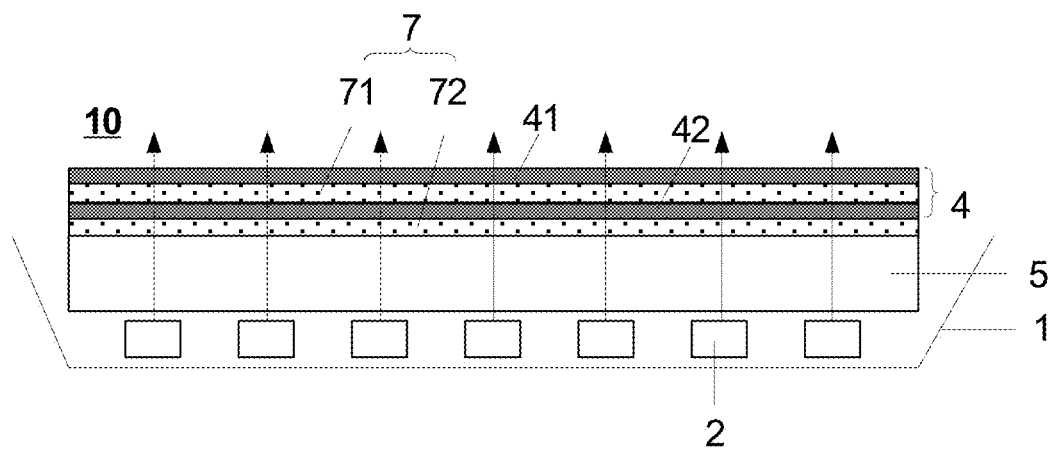
FIG. 9 is a schematic view of a backlight assembly according to a fifth embodiment of the present disclosure.

In some embodiments, as shown in FIG. 9, the backlight assembly 10 comprises a light source 2, a reflective plate 1, a diffusive plate 5, an optical film group 4, and a light-absorbing film set 7. The light-absorbing film set 7 comprises a first light-absorbing film 71 and a second light-absorbing film 72, wherein the first light-absorbing film 71 is disposed between an upper prism plate 41 and a lower prism plate 42; the second light-absorbing film 72 is disposed at the light-out side of the diffusive plate 5. The first light-absorbing film 71 is doped with a first light-absorbing substance, and the second light-absorbing film 72 is doped with a second light-absorbing substance.

In some preferred embodiments of the present disclosure, the first light-absorbing substance in the first light-absorbing film 71 and the second light-absorbing substance in the second light-absorbing film 72 can absorb different wavelength of light, i.e., the first light-absorbing film and the second light-absorbing film are configured to respectively absorb the light of certain wavelengths of the second primary color light and the third primary color light. For example, the first light-absorbing film is configured to absorb the light of certain wavelengths from the third primary color light, whereas the second light-absorbing film is configured to absorb the light of certain wavelengths from the second primary color light.

Figure 10:
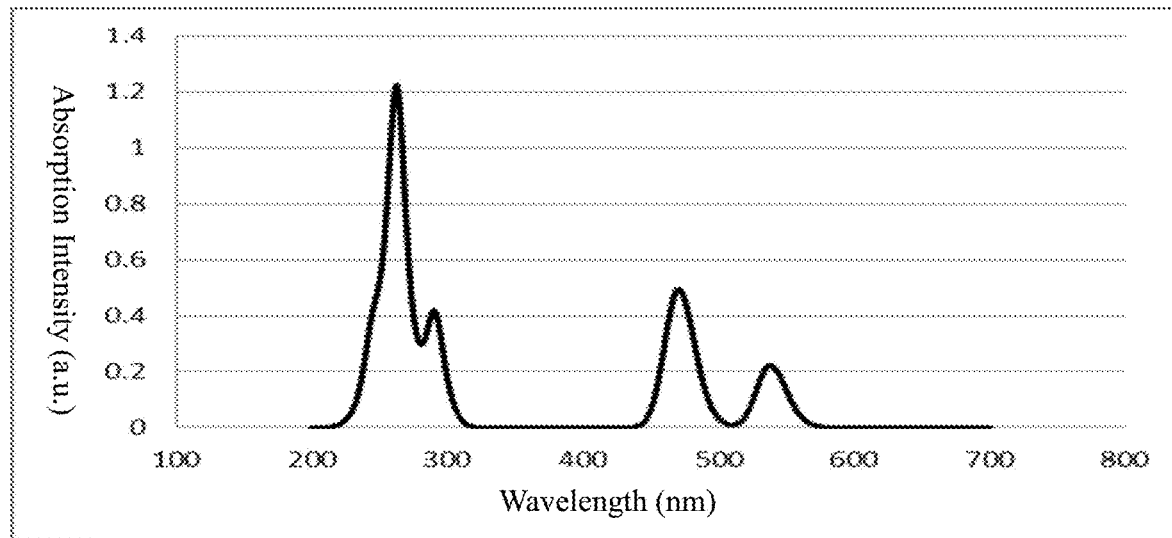
FIG. 10 is a schematic view of the absorption spectrum of the first light-absorbing film according to some embodiments of the present disclosure.

For example, FIG. 10 is a schematic view of the absorption spectrum of a first light-absorbing film doped with a first light-absorbing substance according to some embodiments of the present disclosure. The absorption peak of the first light-absorbing film is about 260 nm, 480 nm, and 540 nm, and as such, the first light-absorbing film can absorb the overlapping portion (~490 nm-510 nm) of the spectrum of the blue light and the spectrum of the green light.

Figure 11:
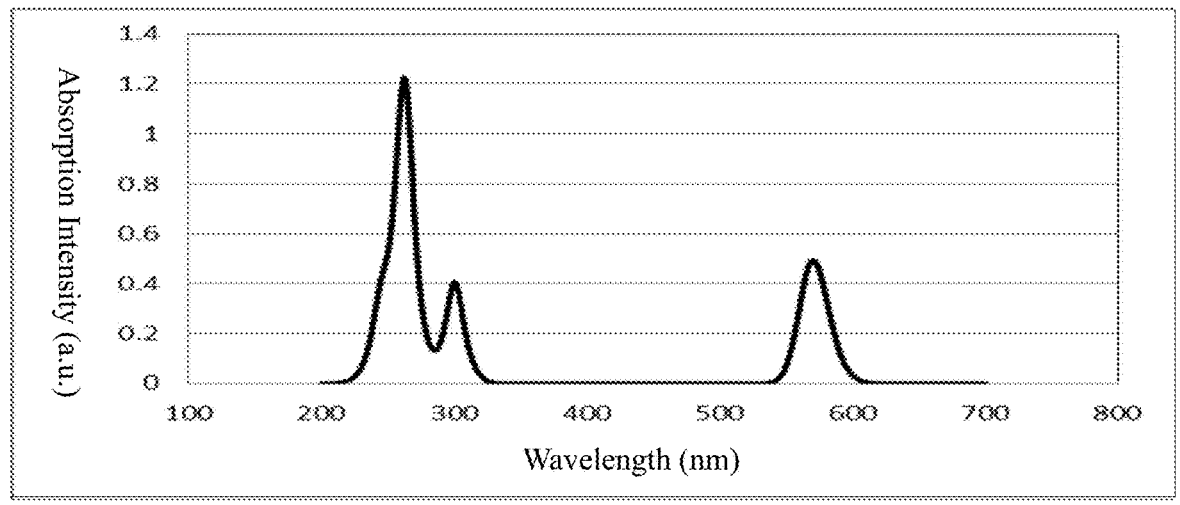
FIG. 11 is a schematic view of the absorption spectrum of the second light-absorbing film according to some embodiments of the present disclosure.

FIG. 11 is a schematic view of the absorption spectrum of a second light-absorbing film doped with a second light-absorbing substance according to some embodiments of the present disclosure. The absorption peak of the second light-absorbing film is about 260 nm and 580 nm, and as such, the second light-absorbing film can absorb the overlapping portion (~560 nm-600 nm) of the spectrum of the green light and the spectrum of the red light.

In some preferred embodiments, the light-absorbing substance is a dye. Specifically, the light-absorbing substance can comprise indigo, wherein the first light-absorbing substance and the second light-absorbing substance can respectively be indigo derivatives.

For example, the first light-absorbing substance can be a cis-isomerized indigo, and FIG. 10 illustrates the absorption spectrum of the first light-absorbing film doped with the first light-absorbing substance. The second light-absorbing substance can be a trans-isomerized indigo, and FIG. 11 illustrates the absorption spectrum of the second light-absorbing substance doped with the second light-absorbing substance. The light-absorbing substance is not limited to the above listed types: for example, it can be other types of indigo derivatives, embodiments of the present disclosure illustrate with the above-described examples.

It should be appreciated that, when both the light in a first overlapping portion between spectra of the first primary color light and the second primary color light and the light in a second overlapping portion between spectra of the second primary color light and the third primary color light are absorbed at the same time, a part of the backlight assembly, such as a light guide plate, can comprise different types of light-absorbing substances at the same time.

The present disclosure further provides a display apparatus, comprising any one of the backlight assemblies as described above.

Figure 12:
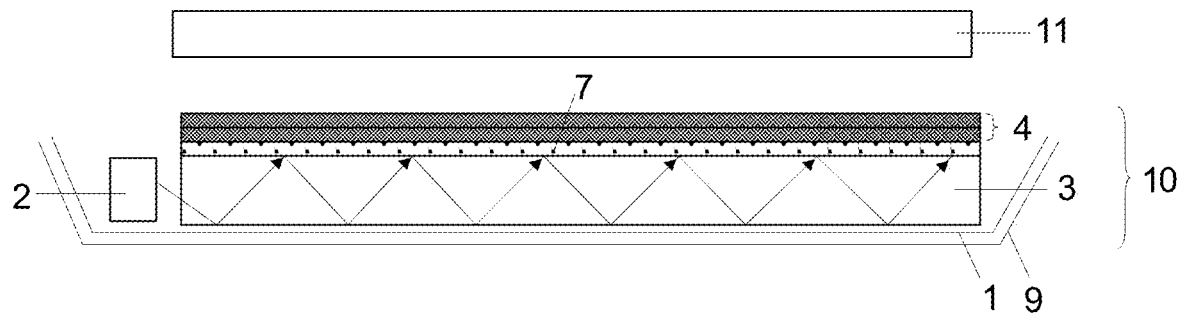
FIG. 12 is a schematic view of a display apparatus according to a first embodiment of the present disclosure.

For example, as shown in FIG. 12, a display apparatus 100 can comprise a backlight assembly 10 and a display panel 11. The display panel 11 is disposed at the light-out side of the backlight assembly 10. The backlight assembly 10 comprises a light source 2, a reflective plate 1, a light guide plate 3, an optical film group 4, a light-absorbing film 7, and a substrate 9, wherein the light source 2 is disposed at the side of the light guide plate 3, and as such, the backlight assembly is a side-in backlight assembly.

Figure 13:
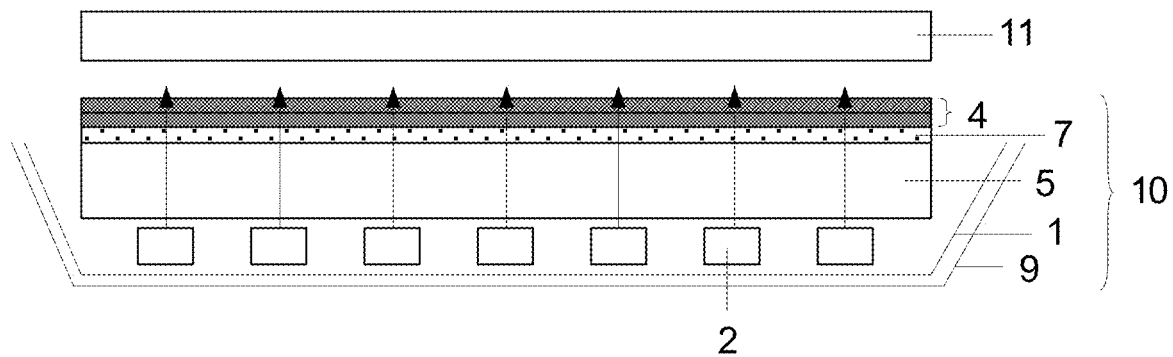
FIG. 13 is a schematic view of a display apparatus according to a second embodiment of the present disclosure.

Alternatively, as shown in FIG. 13, another display apparatus 100 provided by embodiments of the present disclosure comprises a backlight assembly 10 and a display panel 11, wherein the display panel 11 is disposed at the light-out side of the backlight assembly 10. The backlight assembly 10 comprises a light source 2, a reflective plate 1, a diffusive plate 5, an optical film group 4, a light-absorbing film 7 and a substrate 9. The light source 2 is disposed under the diffusion plate 5, and as such, the backlight assembly 10 is a straight-down backlight assembly.

In some embodiments, the light-absorbing substance can be a functional material, and configured as the functional material film 7 disposed in the backlight assembly 10. In some other embodiments, the functional material can be disposed in other layers not limited to the backlight assembly 10.

For example, the functional material can be disposed at a glass layer, one or more of the polarizer (POL) layers (e.g., polymer-sustained-alignment (PSA) layer, support (TAC) layer, polarizing membrane (PVA) layer, etc.), red-green-blue (RGB) filter layer, optical cover (OC) layer, polyimide (PI) layer, or liquid crystal (LC) layer.

In some embodiments, the functional material can be disposed at outer sides of the upper and lower POLPVA layer, such as the upper POL upper TAC layer(s), lower POL lower TAC layer(s), and/or in the various back light layers.

Specifically, in some embodiments, display apparatus further includes a display panel and a polarizer, wherein the at least one functional material is disposed at before and/or after light polarization by the polarizer.

In some embodiments, the polarizer includes: a bottom polarizer proximal to the backlight assembly and including a bottom polarizing membrane (PVA) layer sandwiched between an upper bottom triacetate (TAC) film and a lower bottom TAC film; and a top polarizer distal to the backlight assembly and including a top PVA layer sandwiched between an upper top TAC film and a lower top TAC film.

In some embodiments, the at least one functional material is disposed at the lower bottom TAC film.

In some embodiments, the at least one function material is disposed at the upper top TAC film.

In some embodiments, the polarizer comprises a polyimide (PI) layer integrated with the display panel, and the at least one functional material is disposed at a glass cover over the display panel.

In some embodiments, the display panel comprises a base substrate. The PI layer can be disposed on the base substrate. The at least one functional material can be disposed in the base substrate.

In some embodiments, the base substrate can be a glass substrate.

In some embodiments, the base substrate can be a flexible substrate.

In some embodiments, the display apparatus includes: the backlight assembly including a light source; and the at least one functional material; wherein: the light source is configured to emit a white light; and the at least one functional material is configured to absorb light in at least one of a range of 480 nm-520 nm or a range of 575 nm-600 nm to thereby reshape the white light to have blue, red, and green peaks.

In some embodiments, the at least one functional material is configured to absorb light in the range of 480 nm-520 nm, to thereby reshape the blue, red, and green peaks to be narrower.

In some embodiments, the at least one functional material is configured to further emit light in at least a range of 530 nm-570 nm or a range of 630 nm-650 nm to thereby improve brightness and expand color gamut of the backlight assembly.

In some embodiments, the at least one functional material is configured to emit light in the range of 530 nm-570 nm, and comprises at least one of Poly[2-methoxy-5-(2-ethylhexyloxy)phenylenevinylene-1,4-diyl]((C17H24O2)n), or Poly[2-methoxy-5-(3,7-dimethyloctyloxy)phenylenevinylene-1,4-diyl]((C19H28O2)n).

In some embodiments, the at least one functional material is configured to further emit light at 630 nm-650 nm to thereby improve brightness and expand color gamut of the backlight assembly.

In some embodiments, the at least one functional material comprises a quantum dot material corresponding to light emission at 650 nm.

In some embodiments, the at least functional material is configured to further emit light at 630 nm-650 nm to thereby improve brightness and expand color gamut of the backlight assembly.

In some embodiments, the at least one functional material comprises a quantum dot material corresponding to light emission at 650 nm.

In some embodiments, the at least one functional material comprises at least one dye.

In some embodiments, the at least one dye comprises a cis-isomerized indigo or a trans-isomerized indigo.

In some embodiments, the at least one dye comprises the trans-isomerized indigo having an absorption peak of about 580 nm.

In some embodiments, the functional material can have a light-absorbing wavelength in a range of 480-520 nm, such at about 480 nm, and/or in a range of 575-600 nm, such as 580 nm. Other spectral ranges are also possible.

In some embodiments, the functional material only absorbs light at specified wavelength(s) or wavelength range(s). In some other embodiments, the functional material can also emit light of other wavelength(s), thereby improving light emission and brightness at the other specified wavelength(s). In an example, the functional material can have a light-absorbing wavelength in a range of 480-520 nm, and in a range of 575-600 nm, and also emit light in other specified wavelength(s).

In some embodiments, an In-Cell POL configuration can be adopted. For example, the polarizer comprises a polyimide (PI) layer integrated with the display panel. So long as the at least one functional material is disposed at before and/or after light polarization by the polarizer, the functional material can be disposed in a layer of the display panel. For example, such a layer of the display panel having the functional material can be a glass layer, an RGB layer, an OC layer, a PI layer, or an LC layer in the display panel.

In some embodiments, the functional material is configured to absorb light in the range of 480-520 nm, and emit light around 550 nm. Such a light emission in the yellow-green range can greatly improve the overall brightness of the display module.

To achieve this, the functional material can comprise at least one of Poly[2-methoxy-5-(2-ethylhexyloxy)phenylenevinylene-1,4-diyl]($(C_{17}H_{24}O_2)_n$), or Poly[2-methoxy-5-(3,7-dimethyloctyloxy)phenylenevinylene-1,4-diyl] ($(C_{19}H_{28}O_2)_n$), etc.

In some embodiments, the functional material is configured to absorb light in the range of 480-520 nm, and emit light around 650 nm. Such a light emission in the red range can greatly improve the overall brightness of the display module. For this purpose, the functional material can comprise an organic semiconductor material.

In some embodiments, the functional material is configured to absorb light in the range of 575-600 nm, and emit light around 650 nm. Such a light emission in the red range can greatly improve the overall brightness of the display module. For this purpose, the functional material can comprise an organic semiconductor material.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A display apparatus comprising:
    a display panel;
    a backlight assembly including a light source; and
    an optical film group comprising:
        a functional material layer;
    wherein:
        the light source is configured to emit a white light; and
        the functional material layer is configured to absorb light in at least one of a range of 480 nm-520 nm or a range of 575 nm-600 nm to thereby reshape the white light to have blue, red, and green peaks; and
        the display apparatus further comprises a polarizer (POL) comprising one or more polarizer sub-layers, wherein the functional material layer and one of the one or more polarizer sub-layers are configured as one same layer.

2. The display apparatus of claim 1, wherein one of the one or more polarizer sub-layers is a polymer-sustained-alignment (PSA) layer, and wherein the functional material layer and the PSA layer of the polarizer are configured as the one same layer.

3. The display apparatus of claim 1, wherein one of the one or more polarizer sub-layers is a triacetate (TAC) layer, and wherein the functional material layer and the triacetate (TAC) of the polarizer are configured as the one same layer.

4. The display apparatus of claim 1, wherein one of the one or more polarizer sub-layers a polarizing membrane (PVA) layer, and wherein the functional material layer and the polarizing membrane (PVA) of the polarizer are configured as the one same layer.

5. The display apparatus of claim 1, wherein the optical film group comprises only one functional material layer that is formed continuously.

6. The display apparatus of claim 1, wherein the functional material layer is configured to absorb light in the range of 480 nm-520 nm, to thereby reshape the blue, red, and green peaks to have reduced widths.

7. The display apparatus of claim 6, wherein:
    the functional material layer is configured to further emit light in at least a range of 530 nm-570 nm or a range of 630 nm-650 nm, to thereby improve brightness and expand color gamut of the backlight assembly.

8. The display apparatus of claim 7, wherein:
    the functional material layer is further configured to emit light in the range of 530 nm-570 nm, and comprises at least one of Poly[2-methoxy-5-(2-ethylhexyloxy)phenylenevinylene-1,4-diyl]((C17H24O2)n), or Poly[2-methoxy-5-(3,7-dimethyloctyloxy)phenylenevinylene-1,4-diyl]((C19H28O2)n).

9. The display apparatus of claim 6, wherein the functional material layer is configured to further emit light at 630 nm-650 nm, to thereby improve brightness and expand color gamut of the backlight assembly.

10. The display apparatus of claim 9, wherein the functional material layer comprises a quantum dot material corresponding to light emission at 650 nm.

11. The display apparatus of claim 10, wherein the functional material layer is configured to absorb light in the range of 575-600 nm, and emit light around 650 nm, to thereby improve an overall brightness of the display apparatus.

12. The display apparatus of claim 1, wherein the functional material layer is configured to further emit light in at least a range of 530 nm-570 nm or a range of 630 nm-650 nm, to thereby improve brightness and expand color gamut of the backlight assembly.

13. The display apparatus of claim 12, wherein the functional material layer comprises a quantum dot material corresponding to light emission at 650 nm.

14. The display apparatus of claim 12, wherein the functional material layer is configured to absorb light in the range of 480-520 nm, and emit light around 650 nm, to thereby improve an overall brightness of the display apparatus.

15. The display apparatus of claim 12, wherein the polarizer comprises:
- a bottom polarizer proximal to the backlight assembly and including a bottom polarizing membrane (PVA) layer sandwiched between an upper bottom triacetate (TAC) film and a lower bottom TAC film, wherein the bottom PVA layer, the upper TAC film and the lower bottom TAC film are the sub-layers of the polarizer; and/or,
- the polarizer comprises a top polarizer distal to the backlight assembly and including a top PVA layer sandwiched between an upper top TAC film and a lower top TAC film; wherein the bottom PVA layer, the upper top TAC film and the lower top TAC film are the sub-layers of the polarizer.

16. The display apparatus of claim 15, wherein one of the top polarizer or the bottom polarizer comprises a polyimide (PI) layer integrated with the display panel.

17. The display apparatus of claim 12, wherein the functional material layer comprises at least one dye.

18. The display apparatus of claim 17, wherein the at least one dye comprises the cis-isomerized indigo or the trans-isomerized indigo.

19. The display apparatus of claim 18, wherein the at least one dye comprises the trans-isomerized indigo having an absorption peak of about 580 nm, and the optical film group is configured to have absorption peaks at about 260 nm, 480 nm, 540 nm, and 580 nm.

20. A display apparatus comprising:
- a display panel;
- a backlight assembly including a light source; and
- an optical film group comprising:
- one or two functional material layers;
- wherein:
  - the light source is configured to emit a white light; and
  - each of the one or two functional material layers is configured to absorb light in at least one of a range of 480 nm-520 nm or a range of 575 nm-600 nm to thereby reshape the white light to have blue, red, and green peaks; and
- the display apparatus further comprises a polarizer (POL) comprising a polymer-sustained-alignment (PSA) layer, wherein at least one of the one or two functional material layers and the PSA layer of the polarizer are configured as one same layer.

* * * * *